United States Patent
Schierling

(10) Patent No.: US 7,825,533 B2
(45) Date of Patent: Nov. 2, 2010

(54) TRANSMISSION SYSTEM FOR INTERCHANGING INFORMATION DATA BETWEEN AN ELECTRICAL LOAD AND AN UPSTREAM CONVERTER

(75) Inventor: Hubert Schierling, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 186 days.

(21) Appl. No.: 12/158,882

(22) PCT Filed: Nov. 10, 2006

(86) PCT No.: PCT/EP2006/068324

§ 371 (c)(1),
(2), (4) Date: Jun. 23, 2008

(87) PCT Pub. No.: WO2007/073978

PCT Pub. Date: Jul. 5, 2007

(65) Prior Publication Data

US 2008/0309158 A1 Dec. 18, 2008

(30) Foreign Application Priority Data

Dec. 22, 2005 (DE) .................. 10 2005 061 568

(51) Int. Cl.
*H02J 3/06* (2006.01)
(52) U.S. Cl. ................................................ 307/3
(58) Field of Classification Search .......... 307/3
See application file for complete search history.

(56) References Cited

U.S. PATENT DOCUMENTS

| | | | | |
|---|---|---|---|---|
| 3,859,542 A | * | 1/1975 | Kennedy | 307/401 |
| 4,027,225 A | * | 5/1977 | Elvin | 363/39 |
| 4,803,611 A | * | 2/1989 | Sashida et al. | 363/98 |
| 5,272,429 A | * | 12/1993 | Lipo et al. | 318/808 |
| 5,345,375 A | * | 9/1994 | Mohan | 363/40 |
| 5,442,538 A | * | 8/1995 | Ikeda et al. | 363/95 |
| 5,526,252 A | * | 6/1996 | Erdman | 363/41 |
| 5,734,249 A | | 3/1998 | Pohjalainen et al. | |
| 6,166,928 A | * | 12/2000 | Chandorkar | 363/34 |
| 6,208,537 B1 | * | 3/2001 | Skibinski et al. | 363/40 |
| 6,621,719 B2 | * | 9/2003 | Steimer et al. | 363/43 |
| 7,599,196 B2 | * | 10/2009 | Alexander | 363/13 |
| 2005/0231036 A1 | * | 10/2005 | No et al. | 307/1 |

FOREIGN PATENT DOCUMENTS

CH 320538 A 3/1957

(Continued)

*Primary Examiner*—Jared Fureman
*Assistant Examiner*—Adi Amrany
(74) *Attorney, Agent, or Firm*—Henry M. Feiereisen; Ursula B. Day

(57) ABSTRACT

A transmission system for exchanging information data between an electric load having an emitter and a converter having a receiver is disclosed. The converter and the load are connected by a multi-phase supply cable which is connected to a sinus filter having in-line coils and filter capacitors connected across the phases. An inductive component is integrated in the electric circuit formed by the transmitter, a phase conductor of the supply cable and the receiver, wherein the core of the inductive component already saturates even if the current is significantly less than a rated current of the electric load. This transmission system for information data exchange is easy to implement and enables stable data transfer.

11 Claims, 2 Drawing Sheets

FOREIGN PATENT DOCUMENTS

| | | |
|---|---|---|
| DE | 742 845 C | 12/1943 |
| DE | 19611418 C1 | 8/1997 |
| DE | 19612920 A1 | 10/1997 |
| DE | 19730492 A1 | 2/1999 |
| DE | 199 11 217 A1 | 10/2000 |
| DE | 102 43 563 A1 | 4/2004 |

* cited by examiner

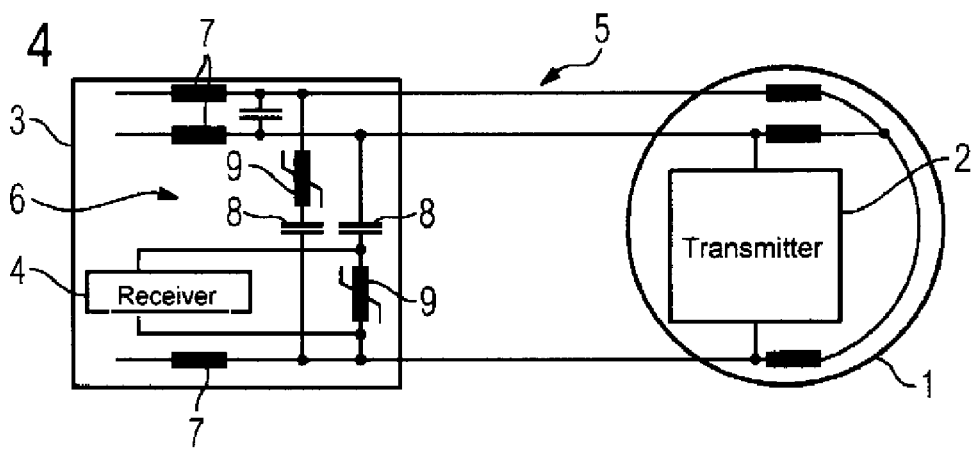
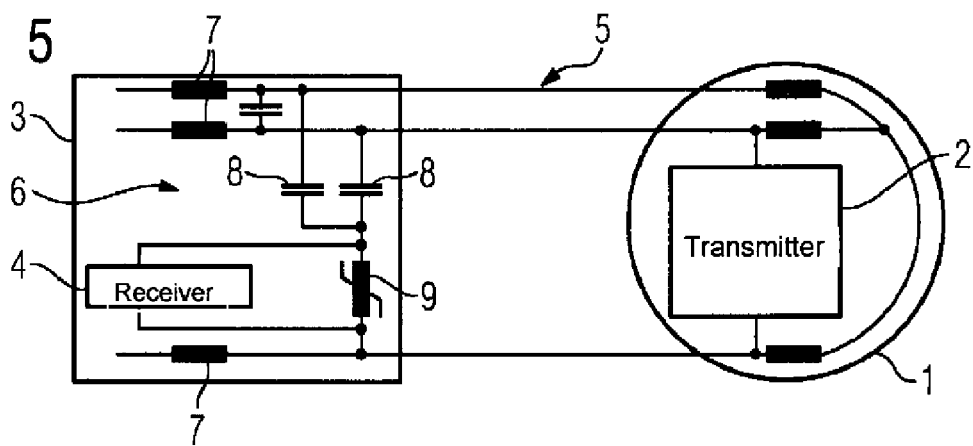
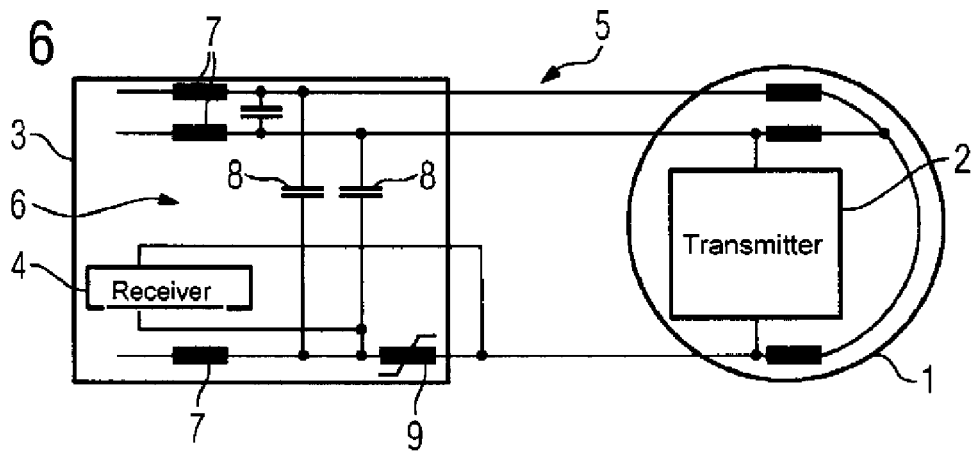
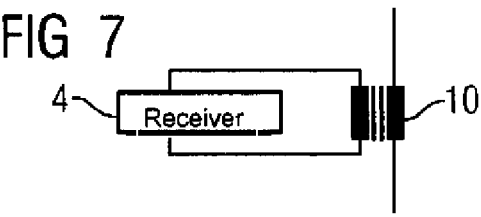

TRANSMISSION SYSTEM FOR INTERCHANGING INFORMATION DATA BETWEEN AN ELECTRICAL LOAD AND AN UPSTREAM CONVERTER

BACKGROUND OF THE INVENTION

The invention relates to a transmission arrangement for interchanging information data between an electrical load, adjacent to which a transmitter is located, and a converter, adjacent to which a receiver is located, via a supply cable which is connected to a sine-wave filter, comprising series inductors and filter capacitors. In particular, the loads may be electrical drive machines, or else other three-phase or single-phase loads, such as solenoid valves, switches, etc.

For a converter, it may be highly important to know data relating to the downstream loads. Means are therefore used to interchange information data between an electrical load and an equipment which is arranged between the load and the electrical supply network and is used for automatic identification of load data, for example rating plate data relating to an electrical drive machine.

The load contains a load identification unit which has at least one such digital rating plate, which is stored in an electronically legible memory means. The load identification unit is coupled via coupling impedances to the supply lines between the load and the converter, by means of which the data from a transmitter in the load identification unit is modulated, after initialization by the converter by means of a carrier frequency that is higher than the mains frequency, onto the voltage on the supply lines, that is to say onto two phase conductors of the supply cable.

By way of example, DE 197 30 492 A1 describes the storage of information relating to the drive machine, such as type information or commissioning information, in a memory unit arranged in the drive machine. This offers the advantage that information relating to the drive machine is available in a form which can be automated by reading the memory unit.

DE 102 43 563 A1 has proposed that information be transmitted from a drive machine to a controller (converter) or the like via a supply line which is used for the electrical power supply. There is advantageously therefore no need for an additional data line. The data transmission is initialized by the upstream controller, likewise via the power supply lines, in particular with a zero-voltage state of the supply lines being used for data transmission. An electrical coil or a capacitive coupling between the cable cores is used as a coupling unit.

A similar measure is known from DE 199 11 217 A1, according to which the information from a converter is modulated at a higher frequency onto a supply line, and is transmitted to at least one further converter, central computer or similar appliance.

The arrangements operate with a constant-voltage frequency converter. Constant-voltage frequency converters are used in particular for supplying electrical power at a controlled voltage and frequency to three-phase machines. They operate with a DC voltage intermediate circuit and a controlled inverter, which is equipped with power semiconductor switches. Power FETs or IGBTs are used as power semiconductor switches, and allow very high-speed switching. Although this has the advantage of very low switching losses, it also results in problems for the insulation materials because of the high dU/dt load on the connected cables between the inverters and the three-phase machine, and may even lead to electromagnetic interference with adjacent signal cables and devices.

It is therefore known for so-called sine-wave filters to be used to cope with these problems. In the simplest embodiment, a sine-wave filter comprises a three-phase series inductor and a capacitance network between an inverter and a three-phase machine. The filter produces a sinusoidal voltage between the three conductors, but effectively also acts as a short circuit for data transmission between a three-phase machine and a converter, so that data can no longer be received at the converter.

Possible ways to cope with this problem will be:
- disconnection of the capacitor on startup, by means of a switch,
- provision of a damping resistance and evaluation of the voltage across this damping resistance, or
- measurement of the current in the motor line or in the capacitor branch.

In the first-mentioned case, not only must an additional switch be provided, but also appropriate control electronics for the switch. In the two last-mentioned alternatives, the measurement signals are so small that it is virtually impossible to evaluate them.

SUMMARY OF THE INVENTION

The invention is based on the object of specifying a transmission arrangement for the information interchange described initially, which is simple and allows stable data traffic.

According to the invention, the object is achieved by a transmission system for interchanging information data between an electrical load, adjacent to which a transmitter is located, and a converter, adjacent to which a receiver is located, via a supply cable which is connected to a sine-wave filter, includes series inductors and filter capacitors, wherein an inductive component is inserted at least into the circuit which is formed by the transmitter, one phase conductor of the supply cable and the receiver, the core of which inductive component enters saturation at a current which is considerably less than the rated current of the load.

Accordingly, an inductive component is inserted at least into the circuit which is formed by the transmitter, one phase conductor of the supply cable and the receiver, the core of which inductive component enters saturation at a current which is considerably less than the rated current of the load.

The transmission arrangement according to the invention
- allows data reception even with filtered drives,
- does not adversely affect the filter effect,
- results in the magnitude of the received signal being independent of the filter impedances, that is to say independent of the appliance power, and
- limits the voltage across the measurement device during normal operation.

BRIEF DESCRIPTION OF THE DRAWING

The invention will be explained in more detail in the following text with reference to a plurality of exemplary embodiments. In the associated drawings:

FIG. 4 shows a second variant of the invention, FIG. 5 shows a third variant of the invention, FIG. 6 shows a fourth variant of the invention, and FIG. 7 shows the inductive component in the form of a transformer.

DETAILED DESCRIPTION OF PREFERRED EMBODIMENTS

Figure 1:
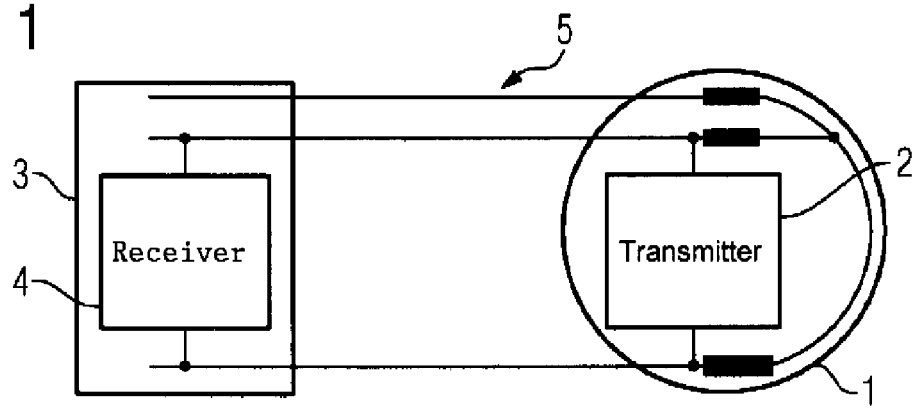
FIG. 1 shows the principle of a transmission arrangement between a motor and an upstream converter.

FIG. 1 shows a data transmission path between a motor 1 with a transmitter 2 and a converter 3 with a receiver 4 via a motor cable 5. When the converter 3 is blocked, the transmitter 2 adjacent to the motor 1 feeds signals into the motor cable 5, and these are evaluated in the receiver 4. The transmission frequency is about 30 kHz. The received signals are at a very low level (mV range).

Figure 2:
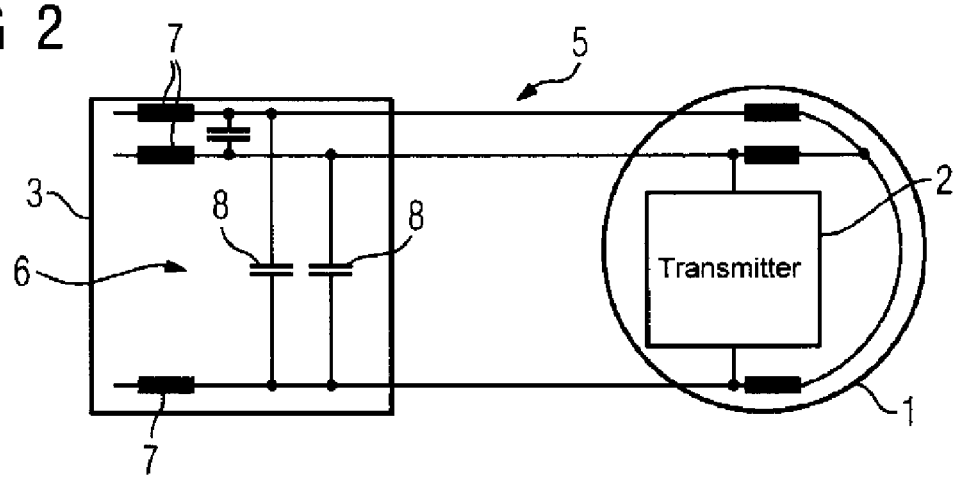
FIG. 2 shows the arrangement of a sine-wave filter on the motor cable.

If the converter 3 is equipped with a sine-wave output filter 6, comprising series inductances 7 and a capacitance network composed of filter capacitors 8, then the filter capacitor 8 short-circuits the cable cores to which the transmitter 2 and receiver 4 are connected (FIG. 2). It is then impossible to evaluate the signals.

If inductive components 9 are introduced into at least two of the three capacitor branches (FIG. 3), then the voltage drop across these inductive components 9 can be measured. During normal operation, the impedances of the inductive components 9 would, however, cause interference because they would cancel out, or at least greatly adversely affect, the filter effect. This effect does not occur by using inductive components 9 which enter saturation even at very low current levels. Inductances such as these are provided, for example, by means of coils with a ferrite core. For example, the ferrite core may be in the form of an annular core through which one conductor is threaded at least once. Because of the high permeability of the ferrite core, it enters saturation even at a very low current level. When the converter 1 is blocked, the current is in contrast virtually zero, and the inductance of the inductive component 9 is fully effective.

FIGS. 3 to 6 show embodiments for the transmission arrangement.

Figure 3:
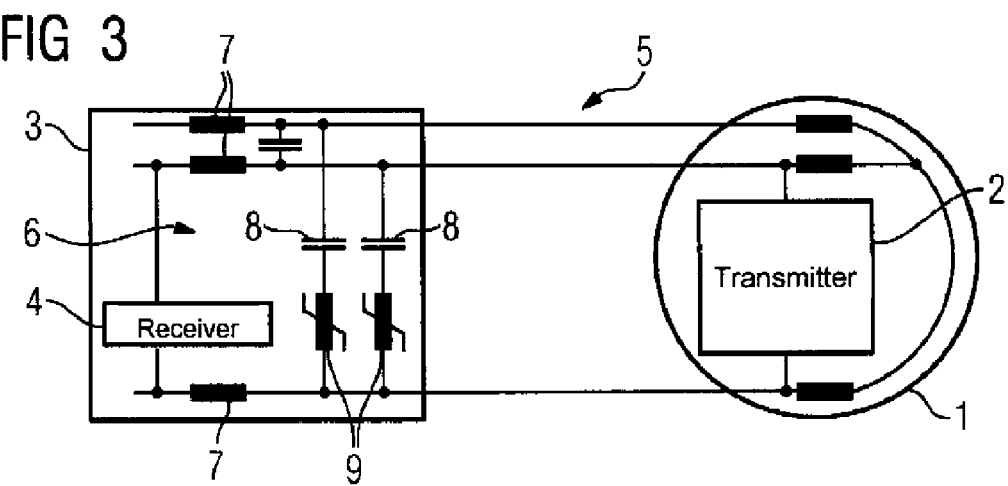
FIG. 3 shows the insertion of inductive components in the transmitter-receiver circuit according to the invention.

In the variant shown in FIG. 3, an inductive component 9 is connected in series with each of the filter capacitors 8, which are connected to the phase conductor to which the receiver 4 is also connected.

In the variant shown in FIG. 4, inductive components 9 are likewise connected in series with the two filter capacitors 8. However, the input voltage to the receiver 4 is tapped off directly from the inductive component 9 which is located in the circuit comprising the transmitter 2, the first phase conductor of the motor cable 5, the filter capacitor 8, and the second phase conductor of the motor cable 5.

According to the variant shown in FIG. 5, the two affected filter capacitors 8 are connected together, and are connected to the common second phase conductor via an inductive component 9.

FIG. 6 shows a variant in which the inductive component 9 is connected directly into one phase of the motor cable 5.

In the variants shown in FIGS. 4 to 6, only low voltages occur on the measurement device even during normal operation. There is therefore no need to disconnect the transmitting and receiving device by means of a relay.

The variants shown in FIGS. 5 and 6 require only a single inductive component 9. According to the variant in FIG. 6, the load current flows directly through the inductive component 9. The filter capacitor 8 causes virtually no adverse effect during normal operation.

If an annular core with a secondary winding is added to a transformer 10 and this is connected to the receiver 4, then this also results in a floating signal (FIG. 7). The signal voltage can be increased by the number of turns. A short-circuiting device, which is not shown here, in the receiver 4 can be used to short-circuit the secondary side during normal operation. This reduces the impedance of the transformer 10. Brief voltage spikes which may possibly otherwise occur during normal operation are prevented. The switching power of the short-circuiting device is very low, since the transformer 10 can transmit only a low power level.

What is claimed is:

1. A transmission system for exchanging information data between an electrical load and a converter over phase conductors connecting the electrical load with the converter, comprising:

a converter having a sine-wave filter which comprises serially connected series inductors in each phase and filter capacitors, a supply cable connecting the phase conductors of the sine-wave filter of the converter with the electric load, a transmitter located in or on the electric load and connected between two phase conductors, said transmitter configured to transmit the information data characteristic of the load, at least one additional inductive component entering saturation at a current which is significantly less than a rated current of the electric load so as to be fully effective at a current level near zero when the converter is blocked, to allow measurement of a voltage drop across the at least one additional inductive component, said at least one additional inductive component connected to at least one of the phase conductors of the supply cable, and a receiver located in or on the converter and connected in parallel with at least the at least one additional inductive component for receiving the information data from the transmitter via the supply cable.

2. The transmission system as claimed in claim 1, comprising two additional inductive components, wherein a first of the additional inductive components is connected in series with a first of the filter capacitors between a first phase conductor and a second phase conductor, and a second of the additional inductive components is connected in series with a second of the filter capacitors between the first phase conductor and a third phase conductor, wherein the receiver is connected to the first phase conductor and one of the second and third phase conductors.

3. The transmission system as claimed in claim 2, wherein the receiver receives an input voltage corresponding to a voltage across one of the at least one additional inductive components.

4. The transmission system as claimed in claim 1, wherein the receiver receives an input voltage corresponding to a voltage across one of the at least one additional inductive components.

5. The transmission system as claimed in claim 1, wherein the additional inductive component is a coil.

6. The transmission system as claimed in claim 1, wherein the additional inductive component is a transformer.

7. The transmission system as claimed in claim 1, wherein the core of the additional inductive component is a ferrite core.

8. The transmission system as claimed in claim 1, wherein the core of the additional inductive component is in form of an annular core.

9. The transmission system as claimed in claim 1, wherein a first of the filter capacitors is connected between a first phase conductor and a junction point and a second of the filter capacitors is connected between a second phase conductor and the junction point, wherein one terminal of the at least one additional inductive component is connected at the junction point and another terminal of the at least one additional inductive component is connected to a third phase conductor different from the first and second phase conductors, with one of the first and second phase conductors and the third phase conductor connected to the transmitter.

10. The transmission system as claimed in claim 9, wherein a second filter capacitor is connected to the junction point.

11. The transmission system as claimed in claim 1, wherein the at least one additional inductive component is serially connected with a series inductor in one of the phase conductors.

* * * * *